United States Patent
Oka et al.

(10) Patent No.: US 6,628,257 B1
(45) Date of Patent: Sep. 30, 2003

(54) DISPLAY DEVICE AND CASING FOR CONTAINING THE DISPLAY DEVICE

(75) Inventors: Kouichi Oka, Ebina (JP); Yasuaki Kuwata, Ebina (JP); Kazuhiro Suzuki, Ebina (JP); Tomo Baba, Ebina (JP); Masashi Hisada, Ebina (JP); Teiichi Suzuki, Ebina (JP); Hiroshi Arisawa, Ebina (JP); Hiroyuki Hotta, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 249 days.

(21) Appl. No.: 09/588,025

(22) Filed: Jun. 6, 2000

(30) Foreign Application Priority Data

Aug. 27, 1999 (JP) ............................................ 11-242134

(51) Int. Cl.[7] ............................ G09G 3/34; G09G 3/36; G06F 3/00
(52) U.S. Cl. ............................ 345/97; 345/84; 345/98; 345/107; 710/1
(58) Field of Search ............................ 345/55, 97, 98, 345/107, 214, 508, 84, 501, 538; 310/328; 307/89; 361/111; 710/1

(56) References Cited

U.S. PATENT DOCUMENTS

| | | | | |
|---|---|---|---|---|
| 4,901,183 A | * | 2/1990 | Lee | 361/111 |
| 5,347,630 A | * | 9/1994 | Ishizawa et al. | 345/538 |
| 5,436,803 A | * | 7/1995 | Annis et al. | 174/35 MS |
| 5,481,274 A | * | 1/1996 | Aratani et al. | 345/97 |
| 5,608,863 A | * | 3/1997 | Ishizawa et al. | 345/501 |
| 5,659,773 A | * | 8/1997 | Huynh et al. | 710/1 |
| 5,703,416 A | * | 12/1997 | Hinkle et al. | 307/89 |
| 6,368,679 B1 | * | 4/2002 | Schmidt et al. | 252/299.01 |
| 6,373,461 B1 | * | 4/2002 | Hasegawa et al. | 310/328 |

FOREIGN PATENT DOCUMENTS

| | | | | |
|---|---|---|---|---|
| JP | A-2-254420 | | 10/1990 | |
| JP | 10161161 A | * | 6/1998 | G02F/1/167 |
| JP | A-2000-75805 | | 3/2000 | |

* cited by examiner

*Primary Examiner*—Bipin Shalwala
*Assistant Examiner*—Prabodh Dharia
(74) *Attorney, Agent, or Firm*—Oliff & Berridge, PLC (57) ABSTRACT

A display device having a memory property capable of maintaining a displayed information even in a state of being separated away from a power source as a result of decreasing the effect of external noise. The display device is detachably attached to a control unit that includes a drive circuit and a power source for driving the display device. The display device has a memory property and maintains the displayed image even in a state of being detached from the control unit. An input protection portion which is an electric load such as resistor, IC or capacitor is provided for the input portion leading to matrix electrodes from the connection terminals for electrically connecting the display device to the control unit. This prevents the infiltration of noise through the connection terminals and lowers a change in the displayed image.

20 Claims, 8 Drawing Sheets

DISPLAY DEVICE AND CASING FOR CONTAINING THE DISPLAY DEVICE

BACKGROUND OF THE INVENTION

1. Field of the Invention

The present invention relates to a display device which is so constituted as can be detachably attached to a control device that feeds data to be displayed, and to a casing for containing the display device that is detached.

2. Prior Art

A CRT or a liquid crystal panel has generally been used as a display device for displaying data. In such a display device, the electric power must be maintained supplied together with data to be displayed while the data is being displayed. Modern liquid crystal panels are consuming electric power in very greatly decreased amounts. Though the electric power may be consumed in decreased amounts, the data that is displayed disappears if the power source circuit is broken.

There has further been developed another display device having a memory property. As the display device having a memory property, there have been known, for example, a ferroelectric liquid crystal display and an electrophoretic display. These display devices maintain the displayed data even after the power source circuit is broken once the data has been electrically written by a drive circuit or the like circuit. By utilizing this property, it has been attempted to use the device in a state of not being supplied with electric power by separating the display unit from the power source.

However, the display device having such a memory property involves a problem in that the image that is maintained displayed undergoes a change when the display device that is being separated from the power source receives electric, electromagnetic or magnetic noise from the outer side. Even in a display device without memory property such as CRT, it is considered that the displayed image may undergo a change upon receiving noise. However, the display device without memory property such as CRT, is supplied with data to be displayed and with electric power at all times to rewrite data at all times. Even in case the displayed image instantaneously changes due to noise, the displayed image is restored at a next moment due to the rewriting effected at all times, and the displayed image is not almost affected by a small degree of noise. Therefore, no countermeasure needs to be taken against noise of small degrees.

With the above display device having a memory property, however, if the displayed image undergoes a change due to noise in a state where the display device is separated away from the power source, the display that is changed cannot be returned to the initial display, since the display device is supplied with neither the data being displayed nor the electric power for rewriting the data. Accordingly, the image that is changed upon receiving noise is maintained displayed. Further, the displayed image deteriorates every time when it receives noise. Despite of its memory property, therefore, the display device is not capable of maintaining the displayed image for extended periods of time.

SUMMARY OF THE INVENTION

The present invention was accomplished in view of the above-mentioned circumstances, and provides a display device having a memory property which is capable of maintaining the displayed image even in a state where the display device is separated away from the power source as a result of decreasing the effect of external noise.

In the display device of the invention, an input unit that receives data to be displayed and electric power is provided with an input protection unit which is an electric load such as diode, IC, resistor or capacitor, and when a drive IC is provided, the drive IC is used as the input protection unit. Further, the connection terminals that serve as an input unit is provided with a cover having at least the outer surface layer or the inner surface layer made of a material that shields at least the electric field, electromagnetic field or magnetic field in a state where the display device is detached. Further, the outer surface layer of the display device is formed of a material which shields at least electric field, electromagnetic field or magnetic field.

By employing this constitution, there is realized a display device which does not permit the displayed image to be changed as a result of decreasing the external noise despite the display device is separated away from the control unit.

The invention further provides a case for containing a display device having an image display unit with a memory property that continues to display the image even in a state of not being supplied with electric power, wherein at least the outer surface layer or the inner surface layer is formed of a material that shields at least electric field, electromagnetic field or magnetic field. Upon containing the display device in such a case, external noise is prevented from infiltrating into the display device, and an image is maintained displayed on the display device.

DESCRIPTION OF THE PREFERRED EMBODIMENTS

Figure 1:
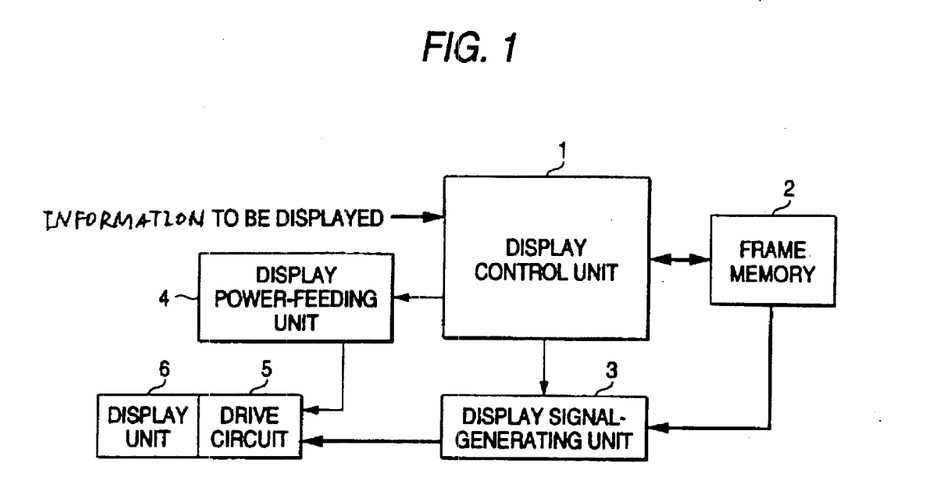
FIG. 1 is a block diagram illustrating a display system inclusive of a display device of this invention.

FIG. 1 is a block diagram illustrating a display system inclusive of a display device of this invention. In FIG. 1, reference numeral 1 denotes a display control unit, 2 denotes a frame memory, 3 denotes a display signal-generating unit, 4 denotes a display power-feeding unit, 5 denotes a drive circuit, and reference numeral 6 denotes a display unit.

The display control unit 1 receives data to be displayed sent from an external unit or a control unit that is not shown, and writes it into the frame memory 2. When the data is to be displayed, the data to be displayed is read out from the frame memory 2, sent to the display signal-generating unit 3 which forms a signal to be displayed and sends it to the drive circuit 5. At the same time, the drive circuit 5 causes the display power-feeding unit 4 to supply electric power for driving the display unit 6. When the writing of data into the display unit 6 is finished, at least the supply of electric power to the drive circuit 5 is interrupted.

Being controlled by the display control unit 1, the frame memory 2 temporarily stores the display data that is sent. Being controlled by the display control unit 1, further, the data to be displayed is sent to the display signal-generating unit 3. The frame memory 2 may be so constituted as to hold data to be displayed in amounts of plural screens. In FIG. 1, the display data that is read out is directly sent to the display signal-generating unit 3. Not being limited thereto only, however, the display data that is read out may be sent to the display control unit 1 so as to be transferred to the display signal-generating unit 3 from the display control unit 1.

The display signal-generating unit 3 receives display data read out from the frame memory 2, forms an image signal to be displayed in synchronism with the drive circuit 5, and sends it to the drive circuit 5.

When the data is to be displayed by the display unit 5, the display power-feeding unit 4 supplies electric power to the drive circuit 5 for driving the display unit 6 according to an instruction from the display control unit 1. The drive circuit 5 operates only when an image signal is written into the display unit 6. Accordingly, a very small amount of electric power is supplied to the drive circuit 5 from the display power-feeding unit 4. Therefore, the drive circuit 5 can be constituted by using a cell, solar cell, or solar cell and storage cell. Or, the power source for the device may be used, but adjusting the voltage to be adapted to the drive circuit 5.

By using the electric power supplied from the display power-feeding unit 4, the drive circuit 5 drives the display unit 6 and writes an image signal handed over from the display signal-generating unit 3 into the display unit 6.

The display unit 6 displays the image written by the drive circuit 5. The display can be changed by electrically rewriting the image to be displayed by the drive circuit 5. The display unit 6 has a memory property and, after the image is written therein, maintains the displayed image despite no electric power is supplied from the drive circuit 5. As the display unit 6 having a memory property, there can be used a ferroelectric liquid crystal display, a cholesteric liquid crystal display or an electrophoretic display.

Figure 2A:
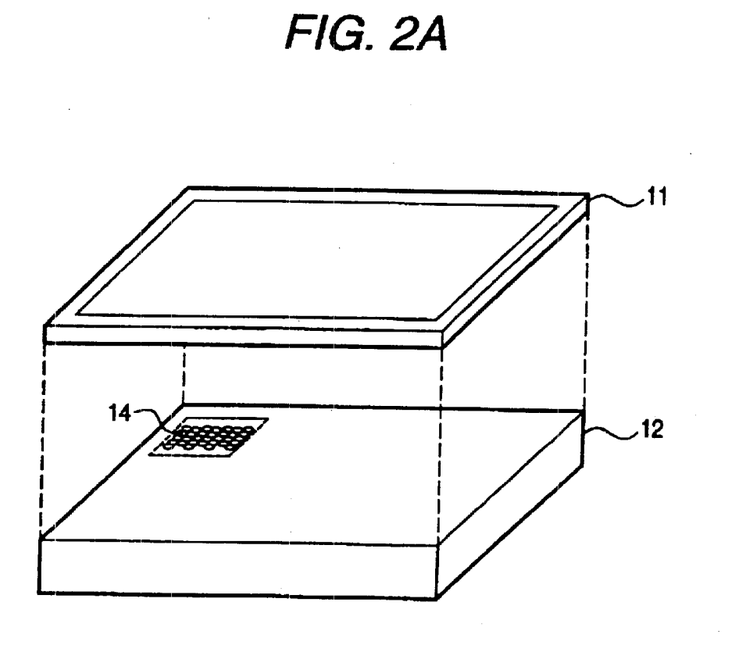
FIGS. 2A and 2B are views illustrating the states of attaching and detaching the display device and a control unit.
Figure 2B:
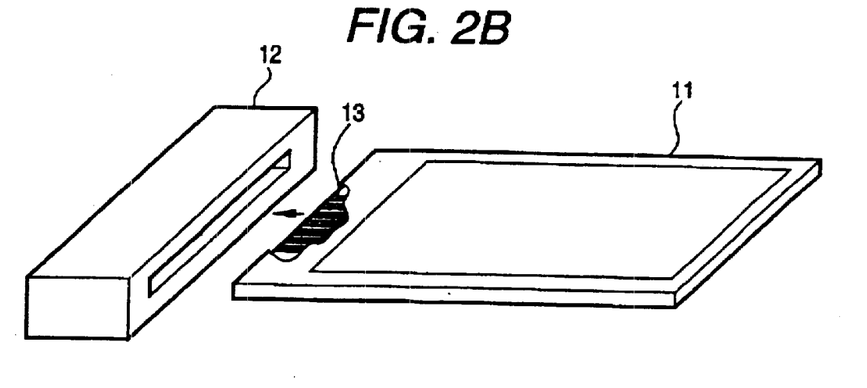

FIGS. 2A and 2B are diagrams illustrating the attachment and detachment of the display device and the control unit according to the invention. In FIGS. 2A and 2B, reference numeral 11 denotes a display device, 12 denotes a control unit, 13 denotes connection terminals on the side of the display device, and 14 denotes connection terminals on the side of the control unit. As shown in FIGS. 2A and 2B, the display device 11 of the invention is constituted so as to be detachably attached to the control device 12. In a state where the display device 11 is attached to the control unit 12, the connection terminals 13 on the side of the display device are electrically connected to the connection terminals 14 on the side of the control unit, and the electric power is supplied and the data to be displayed is transferred from the control unit 12 to the display device 11. In FIG. 2A, though not diagramed, the connection terminals 13 on the side of the display device are provided at a portion opposed to the connection terminals 14 on the side of the control unit. In FIG. 2B, further though not diagramed, the connection terminals 14 on the side of the control unit are formed at the back of the recessed portion in which the display device 11 is inserted.

In the constitution shown in FIG. 2A, the control unit 12 and the display device 11 are joined together in a manner that the display device 11 is placed on the control unit 12. In a portion for accomplishing the electric connection, for example, a member for maintaining good electric coupling may be separately provided. In the constitution shown in FIG. 2(B), the control unit 12 and the display device 11 are joined together in a manner that the display device 11 is partly inserted in the recessed portion of the control unit 12. It is allowable to join the display device 11 and the control unit 12 together in various other forms, as a matter of course.

As the display device 11 shown in FIGS. 2A and 2B, for example, the display unit 6 shown in FIG. 1 is constituted as a single unit, or the display unit 6 and the drive circuit 5 are constituted integrally together, and other portions are constituted as the control unit 12. In this case in FIG. 1, the display unit 6 and the drive circuit 5 are detachably attached together. Or, the drive circuit 5 and, display power-feeding unit 4 and display signal-generating unit 3, are detachably attached together. In either case, when the display device 11 is separated, the display unit 6 of the display device is supplied with neither the electric power from the display power-feeding unit 4 nor the display data from the display signal-generating unit 3 in the control unit 12. However, the display unit 6 has a memory property and maintains the image displayed even in a state where the display device 11 has been detached. For example, there may be provided plural display devices that can be attached, and are suitably replaced to have many display devices display images.

Further, the display device 11 may be constituted to include the display control unit 1, frame memory 2 and display signal-generating unit 3 shown in FIG. 1. In this case, the control unit 12 includes, for example, a power source and a control circuit that is not shown for receiving or forming data to be displayed. When the display device 11 is detached in this constitution, the display control unit 1 ceases to operate since it is no longer supplied with electric power, but the display unit 6 maintains the display.

Figure 3:
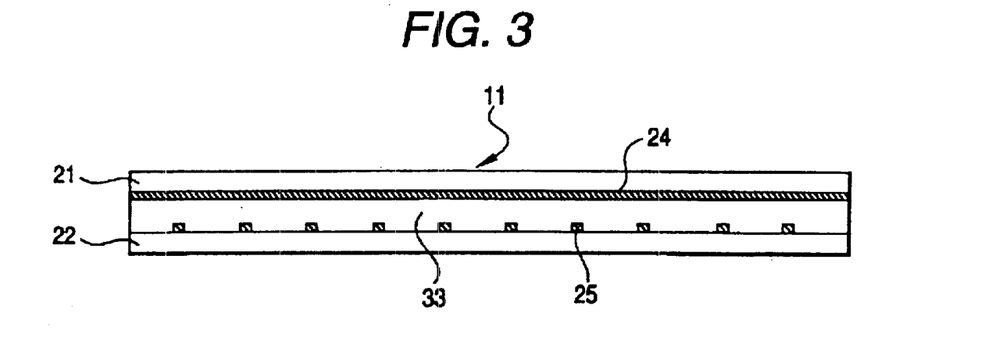
FIG. 3 is a sectional view illustrating a display unit.

FIG. 3 is a sectional view illustrating an example of the display unit 6. In FIG. 3, reference numeral 21 denotes an upper substrate, 22 denotes a lower substrate, 23 denotes ferroelectric liquid crystals, 24 denotes upper substrate electrodes, and reference numeral 25 denotes lower substrate electrodes. Exemplified here is a display of a simple matrix drive using ferroelectric liquid crystals 23 as the display unit 6. On the upper substrate 21 are formed upper substrate electrodes 24 which are parallel electrodes formed of, for example, ITO. Similarly, on the lower substrates 22 are formed lower substrate electrodes 25 which are parallel electrodes formed of, for example, ITO. The upper substrate electrodes 24 and the lower substrate electrodes 25 are opposed at right angles with each other, and ferroelectric liquid crystals 23 are arranged between the upper substrate 21 and the lower substrate 22. The matrix electrodes formed by the upper substrate electrodes 24 and the lower substrate electrodes 25 are selectively driven to change the display for each of the pixels thereby to display an image. By using a material having flexibility as the upper substrate 21 and as the lower substrate 22, there can be constituted the display unit 6 having flexibility.

Though FIG. 3 shows the ferroelectric liquid crystal display of the simple matrix drive, the invention is in no way limited to this constitution only. For example, the drive system may be other than the simple matrix drive that is represented by TFT drive. It is further allowable to employ a display system other than the ferroelectric liquid crystal display, such as cholesteric liquid crystal display or electrophoretic display. The following description deals with the use of the ferroelectric liquid crystal display of the simple matrix drive shown in FIG. 3.

Figure 4:
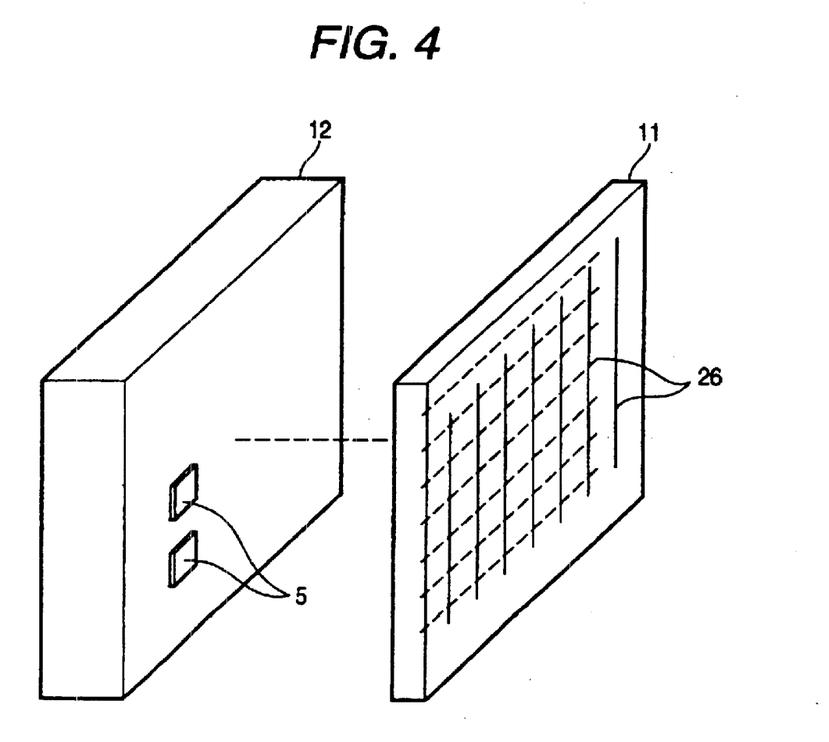
FIG. 4 is a view illustrating a relationship between the display device and the control unit when the display device is constituted by the display unit only.

FIG. 4 is a diagram illustrating a relationship relative to the control unit when the display device is constituted by the display unit only. In FIG. 4, reference numeral 26 denotes matrix electrodes. When the display device 11 is constituted by the display unit 6 shown in FIG. 3 only, other circuits inclusive of the drive circuit 5 shown in FIG. 1 are provided in the control unit 12 as shown in FIG. 4. To change the display, the display device 11 is mounted on the control unit 12 as shown in, for example, FIG. 2(A) to electrically connect the connection terminals on the side of the display device to the terminals on the side of the control unit. Therefore, the matrix electrodes 26 of the display device 11 are selectively driven by the drive circuit 5 in the control unit 12 to display the image. The data to be displayed is transferred from an external unit, or the data stored in the frame memory 2 is used. The connection between the display device 11 and the control unit 12 is not limited to those shown in FIGS. 2A, 2B and 4, but may be in any form.

After the image is displayed, the display device 11 can be separated away from the control unit 12. The ferroelectric liquid crystals 23 have a memory property and maintain the display of an image even after the display device 11 is electrically separated from the control unit 12.

The display device 11 that is electrically separated is supplied with neither the electric power nor the image to be displayed as described above. The matrix electrodes 26 are connected to the terminals on the side of the display device for being connected to the control unit 12, and the terminals on the side of the display are open to the external unit in a state where the display device 11 is separated away from the control unit 12. Therefore, the external noise may enter through the terminals on the side of the display device. If noise is superposed on any of the matrix electrodes 26, a potential difference occurs relative to the opposing electrode, and a value stored in the ferroelectric liquid crystals 23 is often rewritten. Thus, the displayed image gradually changes due to the noise. The displayed image that is changed cannot be returned to the initially displayed image, since the display device 11 that is separated away from the control unit 12 is supplied with neither the electric power nor the data to be displayed.

Figure 5:
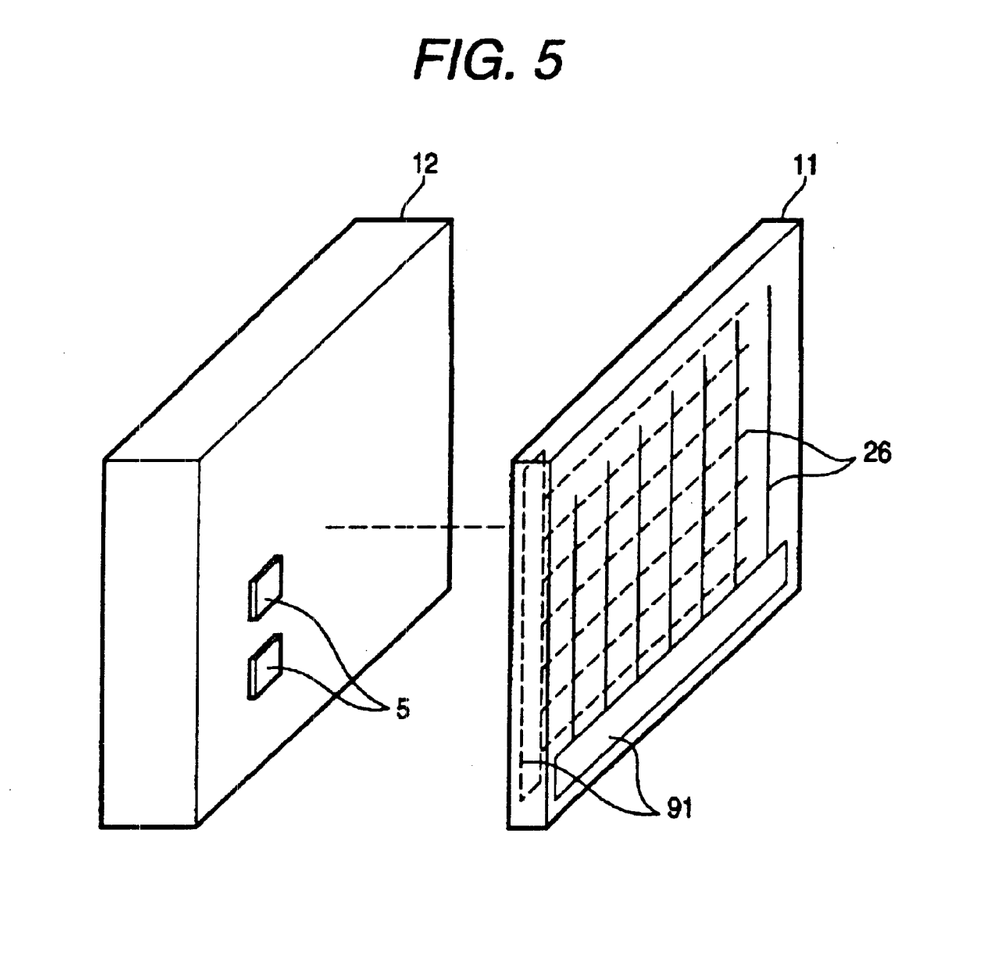
FIG. 5 is a schematic view illustrating a first embodiment of the display device of the invention.

FIG. 5 is a view schematically illustrating a first embodiment of the display device of the invention, and wherein reference numeral 31 denotes input protection portions. In order to prevent the displayed image from being changed by noise or the like as mentioned above, the first embodiment of the display device of the invention is provided with input protection portions 31 at the input portions of the display device 11 leading to the matrix electrodes 26 from the terminals on the side of the display.

As the input protection portions 31, an electric load such as IC, diode, resistor or capacitor is arranged in series. Which one of them should be used as the input protection portions 31 differs depending upon the display device 11, and is suitably selected.

The input protection portions 31 function as noise filters even when electric noise such as static electricity or electromagnetic noise such as electromagnetic waves enters into the display device 11, and the noise is prevented from entering into the matrix electrodes 26 by providing the input protection portion 31. This prevents the disturbance of the image displayed on the display unit 6.

Figure 6:
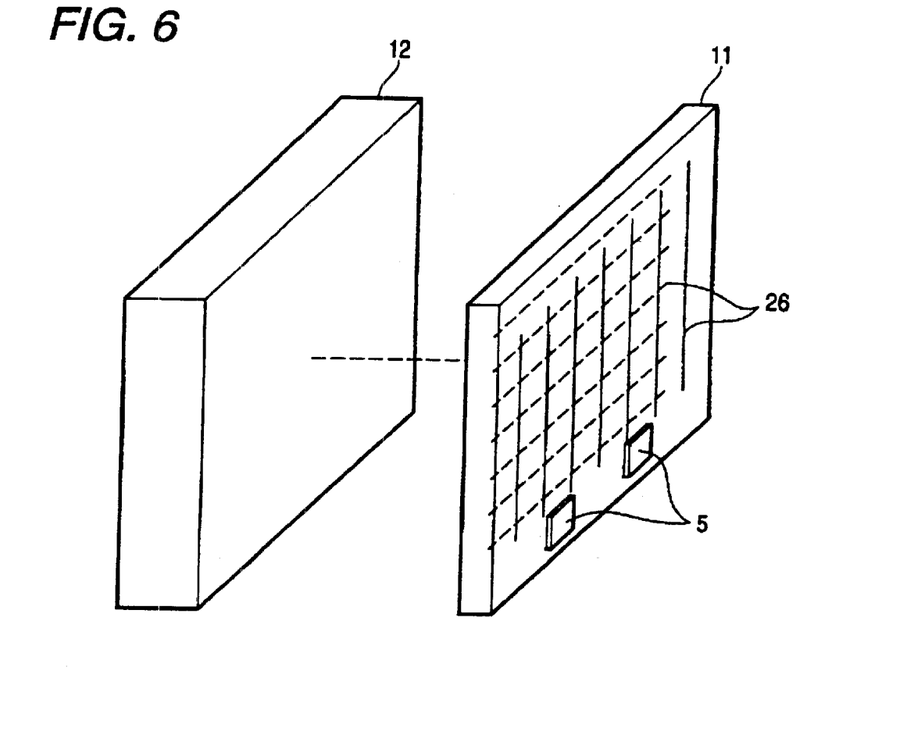
FIG. 6 is a view illustrating a relationship between the display device and the control unit when the display device is constituted by the display unit and a drive circuit.

FIG. 6 is a view illustrating a relationship to the control unit when the display device is constituted by the display unit and the drive circuit. The display device 11 can be constituted by mounting the drive circuit 5 for driving the display unit 6 in addition to mounting the display unit 6 shown in FIG. 3. In this case, other circuits except the display unit 6 and the drive circuit 5 shown in FIG. 1, are provided in the control unit 12 shown in FIG. 6. The connection terminals on the side of the display device are connected to the drive circuit 5, and the connection terminals on the side of the control unit are connected to the display signal-generating unit 3 and to the display power-feeding unit 4.

To replace the display, the display device 11 is mounted on the control unit 12 as shown, for example, in FIG. 2A, and the terminals on the side of the display device are electrically connected to the terminals on the side of the control unit. Therefore, the display device 11 is supplied with electric power from the display power-feeding unit 4 in the control unit 12, and receives display signal from the display signal-generating unit 3. The drive circuit 5 in the display device 11 selectively drives the matrix electrodes 26 of the display unit 6 according to display signals given from the display signal-generating unit 3 in the control unit 12 and rewrites the image displayed on the display unit 6. In this case, too, the data to be displayed is transferred from an external unit, or the data stored in the frame memory 2 is used. The connection between the display device 11 and the control unit 12 is not limited to those of FIGS. 2A, 2B and 6, but may be in any other form.

After the image is displayed, the display device 11 can be separated away from the control unit 12. The ferroelectric liquid crystals 23 have a memory property and maintain the image displayed even when the display device 11 is electrically separated away from the control unit 12.

As described above, the displayed image may be changed by noise input through the terminals of, for example, the display side. When separated away from the control unit 12, the display device 11 is supplied with neither the electric power nor the image to be displayed though it may have the drive circuit 5, and the displayed image cannot be rewritten. Therefore, the displayed image that is changed by noise cannot be returned to the initially displayed image.

In this embodiment as also shown in FIG. 5, the input protection portions 31 are provided on input portions leading to the matrix electrodes to prevent the displayed image from being disturbed by noise as mentioned above. In the constitution in which the drive circuit 5 is mounted on the display device 11 as shown in FIG. 6, the drive IC constituting the drive circuit 5 can be used as an input protection portion 31. Generally, the IC has an impedance of from about 0.1 to about 10 k$\Omega$ and works as an input protection portion 31 to a sufficient degree.

Thus, the drive circuit 5 used as an input protection portion 31 works as a noise filter against electric noise such as static electricity and electromagnetic noise such as electromagnetic waves that enter into the display device 11, and hence, noise is prevented from entering into the matrix electrodes 26. This prevents the image displayed on the display unit 6 from being disturbed. Further, the extra circuit elements need not be provided, and the display device 11 does not become bulky.

Figure 7:
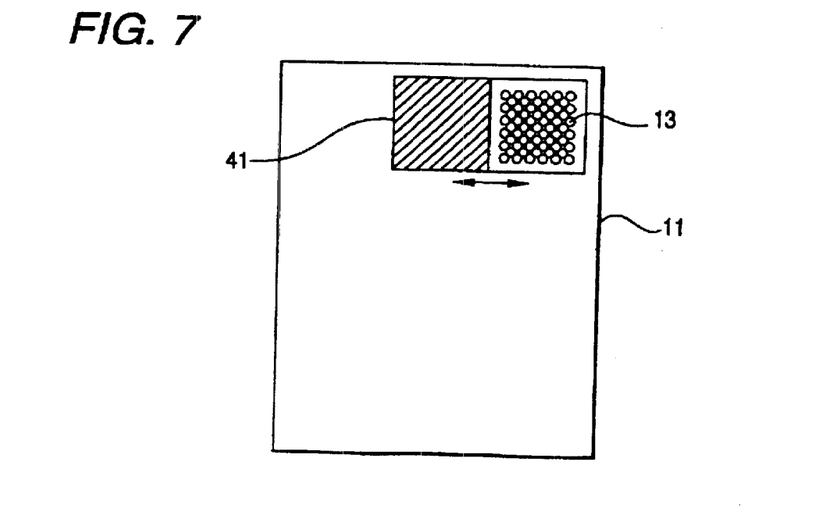
FIG. 7 is a schematic view illustrating a second embodiment of the display device of the invention.

FIG. 7 is a view schematically illustrating a second embodiment of the display device of the invention, wherein reference numeral 41 denotes a cover. In a state where the display device 11 is detached from the control unit 12 as described above, the display device 11 is supplied with neither electric power nor data to be displayed. Therefore, the display that is changed by noise cannot be returned to the initial state. In particular, noise in many cases enter through the connection terminals 13 on the side of the display device, since the electrically conducting portions are exposed to the external side. In the second embodiment, therefore, an electrically conducting cover 41 is provided in the portion of the connection terminals 13 on the side of the display device and in the vicinity thereof.

In a state where the display device 11 is detached from the control unit 12, the electrically conducting cover 41 is so arranged as to cover the portion of the terminals 13 on the side of the display device and the vicinity thereof. In a state of being connected to the control unit 12, further, the portion of the connection terminals 13 on the side of the display device is opened so that the terminals 13 on the side of the display device can be electrically connected to the connection terminals on the side of the control unit.

FIG. 7 illustrates a state where a portion of the connection terminals 13 on the side of the display device is opened. The electrically conducting cover 41 can be slid or rotated so as to cover the portion of the connection terminals 13 on the side of the display device. Further, the cover 41 can be so constituted as can be opened or closed in cooperation with the moving mechanism on the side of the control unit 12 by using, for example, a spring or the like.

The material forming the electrically conducting cover 41 may be the one having electrically conducting property, such as metal, electrically conducting resin or the like. Or, the same effect can be obtained by applying an electrically conducting coating material onto at least the outer surface or the inner surface of the insulating material that is generally used such as resin material. A film having a similar function may be stuck instead of applying the coating material. To shield intense electromagnetic waves, it is recommended to use the cover 41 of a material having large magnetic permeability, large dielectric constant and good electrically conducting property, such as a copper plate. Magnetic noise can be favorably prevented by the cover 41 of a permalloy which is a magnetism-shielding material.

By providing the cover 41 constituted by the electrically conducting material or the magnetism-shielding material on the portion of the terminals 13 on the side of the display device, it is allowed to prevent electric noise such as static electricity, electromagnetic noise such as electromagnetic waves or magnetic noise from directly entering into the terminals 13 on the side of the display device. Further, the cover 41 prevents the terminals 13 on the side of the display device from being touched by hand of a person who handles it in a state where the display device 11 is detached from the control unit 12. This prevents the effect caused by static electricity of the person who handles it, contamination and corrosion to the connection terminals 13 on the side of the display device.

In the embodiment shown in FIG. 7, the display device 11 may be constituted by the display unit 6 only without including the drive circuit 5, or the display device 11 may be constituted to include the drive circuit 5. Further, the display control unit 1 may be included. FIG. 7 has illustrated an embodiment in which the display device 11 and the control unit 12 were connected together in a form as shown in FIG. 2A. Even for the connection of the form shown in FIG. 2B, the infiltration of noise, etc. can be prevented by covering the portion of the terminals 13 on the side of the display device with the cover 41 made of the electrically conducting material or the magnetism-shielding material. In this case, too, it is desired that the cover is so constituted as can be automatically opened and closed when the display device 11 is to be fitted to the control unit 12.

Figure 8:
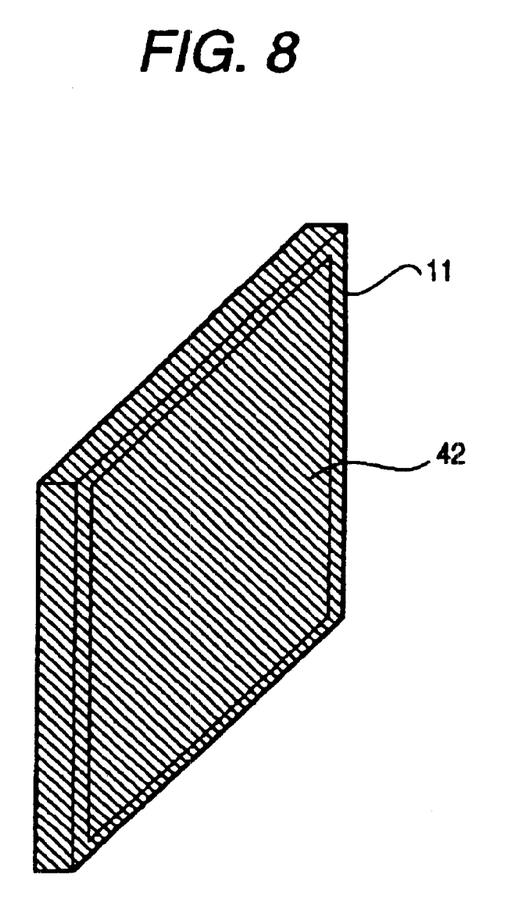
FIG. 8 is a schematic view illustrating a third embodiment of the display device of the invention.

FIG. 8 is a view schematically illustrating a third embodiment of the display device of the invention, wherein reference numeral 42 denotes an electrically conducting material. In this embodiment as shown in FIG. 8, the outer surfaces of the display device 11 inclusive of the image display unit is partly or wholly covered with the electrically conducting material 42. The covering with the electrically conducting material 42 is electrically connected so as to assume a uniform potential. The electrically conducting material 42 may be the one having electrically conducting property, such as metal or electrically conducting resin. The same effect can also be obtained by applying an electrically conducting coating material on at least the outer surface or the inner surface of the insulating material such as resin material that is usually used. A film having the same function may be stuck instead of applying the coating material. The coating on the image surface must be transparent. Therefore, a transparent metal film such as ITO should be used. Or, the electrically conducting material 42 may be arranged like a mesh among the display pixels to obtain the same effect.

To shield the device from intense electromagnetic waves, the portions where the electromagnetic waves may easily enter should be covered with a material having a large magnetic permeability and a large dielectric constant, such as copper plate. To prevent magnetic noise, further, the portions where magnetism may easily enter should be covered with a permalloy which is a magnetism-shielding material.

Thus, the surfaces of the display device 11 inclusive of the image display unit is partly or wholly covered with the electrically conducting material 42 or the magnetism-shielding material having the uniform potential, in order to prevent electric noise such as static electricity, electromagnetic noise such as electromagnetic waves or magnetic noise from entering into the display device 11 and, hence, to prevent the displayed image from being disturbed.

In the embodiment shown in FIG. 8, too, the display device 11 may be constituted by the display unit 6 only without including the drive circuit 5, or the display device 11 may be constituted to include the drive circuit 5. Further, the display control unit 1 may be included.

Figure 9:
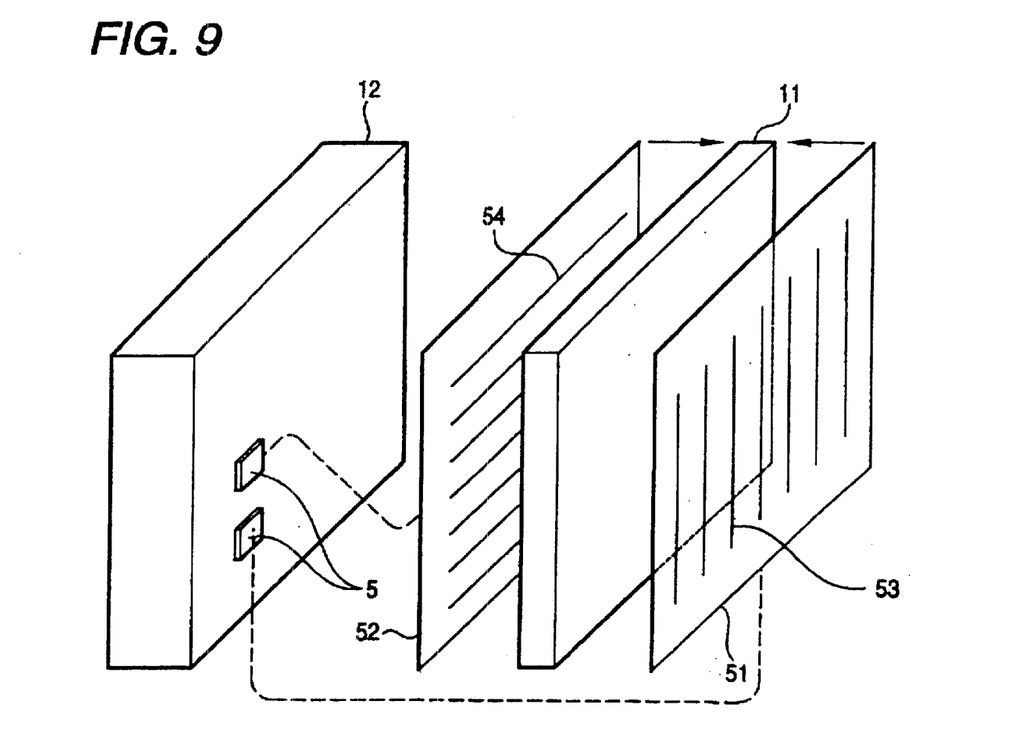
FIG. 9 is a view illustrating a relationship between the display device without drive electrodes and the control unit.

In this embodiment, the display device 11 may not be provided with drive electrodes such as matrix electrodes. FIG. 9 is a view illustrating a relationship between the display device of a constitution without drive electrodes and the control unit. In the drawing, reference numeral 51 denotes an outer upper substrate, 52 denotes an outer lower substrate, 53 denotes outer upper substrate electrodes and 54 denotes outer lower substrate electrodes. In this embodiment, the display device 11 is constituted with, for example, ferroelectric liquid crystals sandwitched between two pieces of substrates. Here, however, no electrode is formed on the two pieces of substrates, and there exists no electrically connected portion.

On the side of the control unit 12, there are provided an outer upper substrate 51 on which are formed outer upper substrate electrodes 53 which are parallel electrodes and an outer lower substrate 52 on which are formed outer lower substrate electrodes 54 which are parallel electrodes. To write an image to be displayed into the display device 11, the outer upper substrate electrodes 53 and the outer lower substrate electrodes 54 are opposed to each other at right angles, and the display device 11 is sandwiched therebetween. The matrix electrodes formed by the outer upper substrate electrodes 53 and the outer lower substrate electrodes 54 are selectively driven by the drive circuit 5 in the control unit 12 to change the display for each of the pixels of the display device 11 thereby to display the image.

Figure 10:
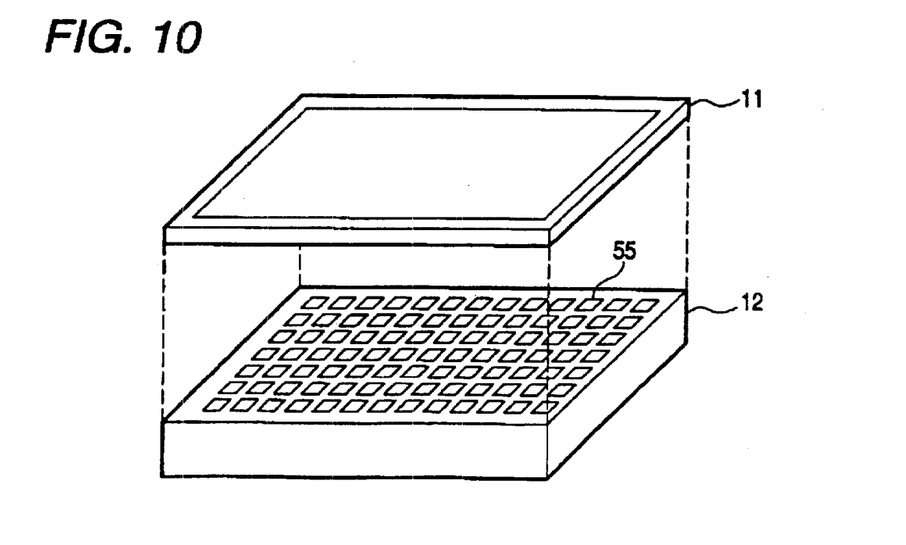
FIG. 10 is a view illustrating another relationship between the display device without drive electrodes and the control unit.

FIG. 10 is a view illustrating another relationship between the display device without drive electrode and the control unit, wherein reference numeral 55 denotes cell electrodes. In this case, too, the display device 11 has no drive electrode such as matrix electrode like in the case of FIG. 9. In this case, a uniform potential is maintained on the surface of the display device 11 on the side opposite to the surface facing the control unit 12.

On the surface on the side of the control unit 12, cell electrodes 55 are arranged for each of the pixels of the display device 11. To write the image to be displayed into the display device 11, the display device 11 is placed on the cell electrodes 55 arranged on the control unit 12. The control unit 12 changes the potential into positive sign or negative sign for each of the cell electrodes 55 to change the display for each of the pixels of the display device 11 thereby to display the image.

The display devices 11 shown in FIGS. 9 and 10 have no portion electrically connected to the control unit 12. However, the displayed image may often be changed due to noise penetrating through the display device 11. Like in the above-mentioned third embodiment, the outer surfaces of the display device 11 inclusive of the image display portion may be partly or wholly covered with an electrically conducting material 42 or a magnetism-shielding material to prevent the effect of noise and to prevent the disturbances on the displayed image.

In the foregoing were described the first to third embodiments of the display device 11 to cope with the noise. These countermeasures against the noise may be suitably combined together. For example, the input protection portion 31 is inserted in the connection terminals on the side of the display device, the connection terminals on the side of the display device is covered with the electrically conducting cover 41 that can be opened and closed, and the whole display device 11 is covered with the electrically conducting material 42.

Figure 11:
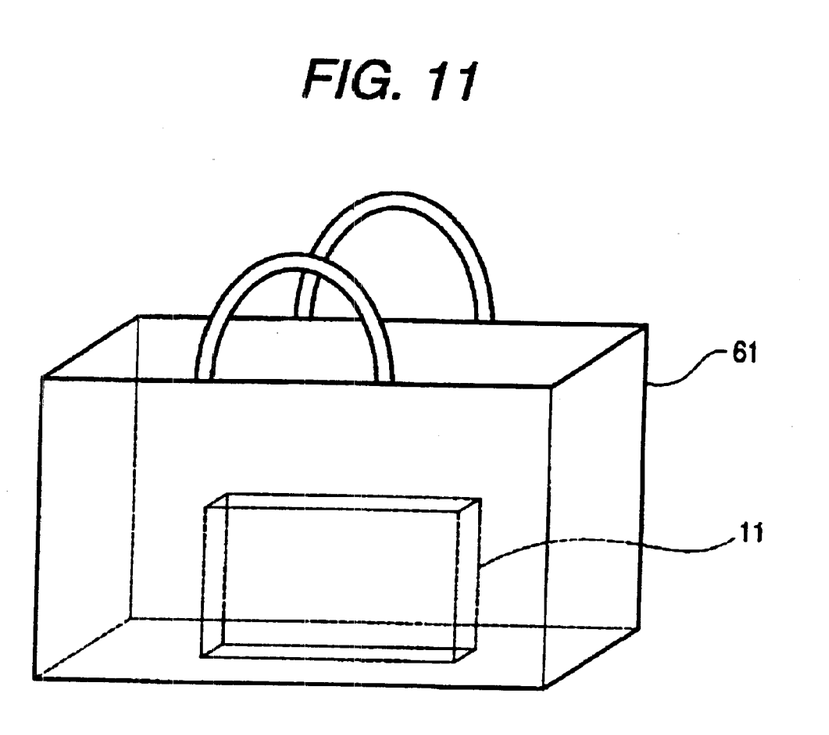
FIG. 11 is a perspective view illustrating an embodiment of a case for containing the display device of the invention.

FIG. 11 is a perspective view illustrating an embodiment of a case for containing the display device according to the invention, and wherein reference numeral 61 denotes the container case. In a state where the display device 11 having a memory property is detached from the control unit 12, as described above, the displayed image may often be changed by noise. FIG. 11 illustrates the container case for containing, holding and transporting the display device 11 that is detached from the control unit 12.

The container case 61 has an electrically conducting layer of a uniform potential formed on at least a part thereof or, preferably, on the whole outer surface or the inner surface thereof. The electrically conducting material may be the one having an electrically conducting property, such as metal or electrically conducting resin. The container case 61 may be constituted by an electrically conducting material only. The same effect can also be obtained by applying an electrically conducting coating material on at least the outer surface or the inner surface of an insulating material such as resin, cloth or paper that is usually used as a material of the case. Further, a film having a similar function may be stuck instead of applying the coating material. To shield the device from intense electromagnetic waves, the container case should be made of a material having a large magnetic permeability, a large dielectric constant and electric conductivity, such as copper plate. To block magnetic noise, the container case 61 should be made of a permalloy or the like which is a magnetism-shielding material.

In a state where the display device 11 is contained in the container case 61, the container case 61 blocks electric noise such as static electricity, electromagnetic noise such as electromagnetic waves or magnetic noise that may generate just in the vicinity of the container case 61. This prevents the infiltration of electric noise such as static electricity, electromagnetic noise such as electromagnetic waves or magnetic noise from directly entering into the display device 11, and suppresses a change in the displayed image.

The device 11 to be contained may be constituted in any form, such as including the display unit 6 only without including the drive circuit 5, including the drive circuit 5 together with the display unit 6, or further including the display control unit 1. As shown in FIGS. 9 and 10, further, the display device 11 may not have drive electrode. It is allowable to provide the display device with countermeasures against noise as described in the first to third embodiments.

The container case 61 is not limited to the one of the shape shown in FIG. 11. For example, the upper part, too, may be closed to prevent the infiltration of noise from the upper side. Or, it may be in the shape of a bag without grip. The container case 61 can be constituted in various other shapes in addition to the shape of a brief bag shown in FIG. 11. For example, the bag may be just in a size of the outer shape of the display device 11, like a CD case, enabling the displayed image to be seen in a state of being contained therein. Or, it may be in the form of a case like a box, a sport bag or an attaché case. Or, it may be constituted in the form of a rigid reusable box or an envelope so that it can be mailed. It is allowable that the container case 61 may be so constituted as to contain plural display devices 11, as a matter of course.

According to the present invention as will be obvious from the foregoing description, there is provided a display device having a memory property which in a state of being detached from the control unit, permits the displayed image to be little disintegrated as a result of preventing external electric, electromagnetic and magnetic noise from entering into the display device that is holding the displayed image.

The display device which has a memory property and are detached from the control unit is contained in the display device-container case of the invention to prevent external electric, electromagnetic and magnetic noise from infiltrating into the display device that is holding the displayed image. Therefore, the image displayed by the display device contained therein is little disintegrated.

What is claimed is:

1. A display device detachably attached to a control unit that supplies information to be displayed and an electric power, the device comprising:

information display means, with a memory display property, for continuously displaying information when attached to and detached from said control unit;

an input portion that receives, from the control unit, the information to be displayed on the information display means and the electric power; and input protection means provided in the input portion, wherein the information display of the information display means remains uninterrupted during a disruption of the electric power and the information to be displayed at the input portion.

2. A display device according to claim 1, wherein the input protection means is an electrical load.

3. A display device according to claim 2, wherein the electrical load is a diode.

4. A display device according to claim 2, wherein the electrical load is an IC.

5. A display device according to claim 2, wherein the electrical load is a resistor.

6. A display device according to claim 2, wherein the electrical load is a capacitor.

7. A display device according to claim 2, wherein the electric load is a drive IC that also drives the information display means.

8. A display device according to claim 1, wherein the information display means is a ferroelectric liquid crystal display.

9. A display device according to claim 1, wherein the information display means is an electrophoretic display.

10. A display device according to claim 1, wherein the information display means is a display comprising simple matrix drive electrodes formed on two substrates sandwiching a display medium therebetween.

11. A display device according to claim 10, further comprising:

drive means for driving the information display means, wherein the information display means is driven by the drive means via the simple matrix drive electrodes.

12. A display device according to claim 10, wherein the information display means is driven by drive means provided in the control unit through the simple matrix drive electrodes.

13. A display device according to claim 1, wherein the information display means is a display comprising two substrates sandwiching a display medium therebetween, the substrates having no drive electrode.

14. A display device according to claim 1, wherein the input protection means is provided in the input portion leading to upper substrate electrodes and lower substrate electrodes, which are opposed each other, from terminals of the display device.

15. A display device detachably attached to a control unit that supplies information to be displayed and an electric power, the device comprising:

information display means, with a memory display property, for continuously displaying information when attached to and detached from said control unit;

a connection terminal portion electrically connected to the control unit; and a cover having an outer surface layer and an inner surface layer, at least one of which surface layers is formed of a material that shields at least one of an electric field and an electromagnetic field, or a magnetic field, the cover being provided on at least the connection terminal portion to provide shielding when the display device is detached from the control unit, wherein the information display of the information display means remains uninterrupted during a disruption of the electric power and the information to be displayed at the connection terminal portion.

16. A display device according to claim 15, wherein the shielding material is a conductive material having a substantially uniform potential.

17. A display device which has information display means, with a memory display property, for continuously displaying information when attached to and detached from a control unit, and is detachably attached to the control unit that supplies information to be displayed and an electric power to the information display means, wherein at least part of an outer surface layer of the device is formed of a material that shields at least one of an electric field and an electromagnetic field, or a magnetic field, and wherein the information display of the information display means remains uninterrupted during a disruption of the electric power and the information to be displayed associated with detachment of the display device from the control unit.

18. A display device according to claim 17, wherein the shielding material is a conductive material having a substantially uniform potential.

19. A case for containing a display device having information display means, with a memory display property, for continuously displaying information when attached to and detached from a control unit, and is detachably attached to the control unit that supplies information to be displayed and an electric power to the information display means, wherein at least part of an outer surface layer of the device is formed of a material that shields at least one of an electric field and an electromagnetic field, or a magnetic field, and wherein the information display of the information display means remains uninterrupted during a disruption of the electric power and the information to be displayed to the information display means.

20. A case for containing a display device according to claim 19, wherein the shielding material is a conductive material having a substantially uniform potential.

* * * * *